United States Patent [19]

Nourrcier

[11] Patent Number: 5,726,742
[45] Date of Patent: Mar. 10, 1998

[54] CIRCUIT AND METHOD FOR DETERMINING TIME OF ARRIVAL

[75] Inventor: Charles E. Nourrcier, Lakewood, Calif.

[73] Assignee: Hughes Electronics, Los Angeles, Calif.

[21] Appl. No.: 568,326

[22] Filed: Dec. 6, 1995

[51] Int. Cl.$^6$ .............................. G01C 3/08; G01S 13/08
[52] U.S. Cl. .......................... 356/5.01; 342/135; 327/69; 327/72
[58] Field of Search .................. 356/5.01; 342/118, 342/134, 135; 327/60, 50, 72

[56] References Cited

U.S. PATENT DOCUMENTS

| | | | |
|---|---|---|---|
| 3,763,436 | 10/1973 | Haw | 328/147 |
| 4,518,964 | 5/1985 | Hetyei | 343/7.3 |
| 4,676,660 | 6/1987 | King et al. | 368/113 |
| 4,849,644 | 7/1989 | Mira et al. | 250/561 |
| 5,382,848 | 1/1995 | Borns et al. | 327/18 |

*Primary Examiner*—Mark Hellner
*Attorney, Agent, or Firm*—Gordon R. Lindeen, III; Georgann S. Grunebach; Wanda K. Denson-Low

[57] ABSTRACT

An improved circuit and method of making precise time of arrival measurements on optical pulse data of relatively varying widths. The invention provides an analog input pulse representing received optical pulse data, along with a delayed version of the analog input pulse. The time of delay is set such that the original analog pulse and the delayed analog pulse cross each other at a predetermined point. This cross-over consistently occurs at the same point on the signal independent of the size or shape of the analog pulse. Preferably, the cross-over occurs at approximately 70% of the analog pulse amplitude. The cross-over point between the original pulse and the delayed pulse triggers the generation of the leading edge of a time of arrival pulse.

31 Claims, 3 Drawing Sheets

CIRCUIT AND METHOD FOR DETERMINING TIME OF ARRIVAL

BACKGROUND OF THE INVENTION

This invention relates in general to range finders and other related devices that use reflected optical/electromechanical energy to locate objects. More particularly, it relates to a method and circuit that detects optical energy reflected from an object, then estimates a relatively precise "time of arrival" for detected the detected optical energy.

A range finder is an optical device used to calculate an estimate of the distance or "range" to a target. The range finder is typically placed in close proximity to an associated instrument, such as a military weapon. The estimated distance, along with other information such as atmospheric conditions, is used by the weapon to calculate an estimate of the aim offsets that may be needed in firing at the target, thereby increasing aim accuracy.

In operation, a small burst of laser light is sent to and reflected off of the target. The reflected light enters the range finder's optical system through one or more windows. In estimating distance to the target, the range finder determines the laser light's complete "time of flight," which in turn requires a determination of the time at which the reflected light reaches the range finder, known generally as the "time of arrival."

Known range finders use simple threshold detection to determine "time of flight" and "time of arrival" of the reflected laser light. In a conventional range finder, light originated or reflected from the target is detected by a detector. The detector generates an analog signal representing the detected laser energy. The analog signal is fed to a simple threshold detection circuit that is typically formed from some form of a comparator circuit. One comparator input is coupled to a threshold, and the other comparator input is coupled to the incoming analog signal. Time of arrival is considered to have occurred when the comparator analog signal input exceeds the comparator threshold signal input. If the distance accuracy requirements are only within +/−5 meters, and if the optical pulse is consistently narrow, for example less than about 6 nsec, threshold detection can be an adequate way to determine time of arrival. However, the size of the reflected optical energy pulse can be large or small depending upon the distance to the target and other factors such as atmospheric conditions or the target surface. Also, the shape of the detected optical energy as a function of time is generally Gaussian. Thus, a very strong return pulse produces a large amount of energy above threshold for a long amount of time, and a weak return pulse produces a very small amount of energy that crosses the threshold for a very short amount of time. Accordingly, simple threshold detection has a built-in time ambiguity as to precisely when the pulse arrived.

Further, for distance accuracy requirements of +/−1 meter, and for low-cost smaller laser light sources having relatively wider pulses (about 15 to 25 nsec), simple threshold detection does not provide a sufficiently precise and consistent time of arrival estimate. Accordingly, there is need for circuit and method of making precise and consistent time of arrival measurements on received optical pulse data of widely varying widths, thereby allowing the consistent and accurate calculation of distance estimates in range finders, target designators, and other similar systems.

SUMMARY OF THE INVENTION

The present invention is an improved circuit and method of making precise time of arrival measurements on optical pulse data having widely varying widths. The invention goes beyond simple threshold "time of arrival" detection to allow the consistent and accurate calculation of distance estimates in range finders, target designators, and other similar systems.

The inventive system receives an analog pulse that represents a received optical energy pulse. The received optical energy was preferably reflected or originated from a target object. The invention utilizes a delay circuit configuration to provide a delayed version of the analog pulse. The delay is set such that the analog pulse and the delayed analog pulse cross each other at a predetermined point in time. The cross-over consistently occurs at the same point on the analog pulse independent of the size or shape of the analog pulse. Preferably, the cross-over occurs at approximately 70% of the analog pulse amplitude. The cross-over point between the analog pulse and the delayed analog pulse triggers the leading edge of the time of arrival pulse.

The circuit and method may be implemented by providing a detector, a delay circuit, a first comparator circuit, a second comparator circuit and a logic circuit. The detector output is fed to the delay circuit, the minus input of the first comparator and the plus input of the second comparator. The output of the delay circuit is fed to the minus input of the first comparator, and also provided to the plus input of the second comparator. The minus input of the second comparator is tied to a threshold voltage that sets a desired threshold noise level. The outputs of the first and second comparators are provided to a digital logic circuit that analyzes the comparator outputs and generates a pulse whose leading edge represents the optical data's time of arrival.

In operation, the detector detects optical data and generates an analog output signal representing the optical data. The shape of the analog signal energy as a function of time is generally Gaussian. Thus, the analog signal can vary widely, with a very strong optical data input producing a large amount of energy for a long amount of time, and a weak optical data input producing a very small amount of energy for a very short amount of time.

The first comparator circuit has as its plus and minus inputs the delayed analog signal and the original analog signal, respectively, while the second comparator circuit has as its plus and minus inputs the original analog signal and a threshold voltage, respectively. The second comparator outputs a pulse when the analog signal exceeds the noise threshold. The second comparator output is provided to the logic circuit to indicate to the logic circuit that the analog pulse is present. The logic circuit then looks at the first comparator output.

The first comparator output generates a pulse when the original analog input crosses the delayed analog input. This cross-over consistently occurs at the same point independent of the size or shape of the analog pulse. Preferably, the cross-over occurs at approximately 70% of the analog pulse amplitude. The cross-over point between the original pulse and the delayed pulse triggers the logic circuit to generate the leading edge of the time of arrival pulse.

Accordingly, the present invention provides several advantages. The delay is set such that the analog pulse and the delayed analog pulse cross each other at a predetermined point in time. The cross-over consistently occurs at the same point on the analog pulse independent of the size or shape of the analog pulse. Preferably, the cross-over occurs at approximately 70% of the analog pulse amplitude. The cross-over point between the analog pulse and the delayed analog pulse triggers the leading edge of the time of arrival pulse. Further, for distance accuracy requirements of +/−1 meter, and for low-cost smaller laser light sources having relatively wider pulses (about 15 to 25 nsec), the disclosed delay line circuit provides a sufficiently precise and consistent time of arrival estimate. Accordingly, the circuit and method of present invention makes precise and consistent time of arrival measurements on received optical pulse data of widely varying widths, thereby allowing the consistent and accurate calculation of distance estimates in range finders, target designators, and other similar systems.

The invention itself, together with further objects and attendant advantages, will best be understood by reference to the following detailed description, taken in conjunction with the accompanying drawings.

DETAILED DESCRIPTION

The present invention is an improved circuit and method of making precise time of arrival measurements on optical pulse data of relatively varying width. The invention goes beyond simple threshold detection to allow the consistent and accurate calculation of distance estimates in range finders, target designators, and other similar systems. A circuit embodying important features of the present invention is referred to herein as a delay line differentiation circuit. The delay line circuit may be inserted in a range finder or similar device to provide a precise estimate of time of arrival.

A range finder is an optical device used to calculate an estimate of the distance or "range" to a target. The range finder is typically placed in close proximity to an associated instrument, such as a military weapon. The estimated distance, along with other information such as atmospheric conditions, is used by the weapon to calculate an estimate of the aim offsets that may be needed in firing at the target, thereby increasing aim accuracy.

In operation, a small burst of laser light is sent to and reflected off of the target. Reflected light enters the range finder's optical system, and the range finder calculates an estimate of distance. In estimating distance to the target, the range finder must determine the laser light's complete "time of flight," which in turn requires a determination of the time at which the reflected light arrives at the range finder. This time is known generally as the "time of arrival."

Figure 1:
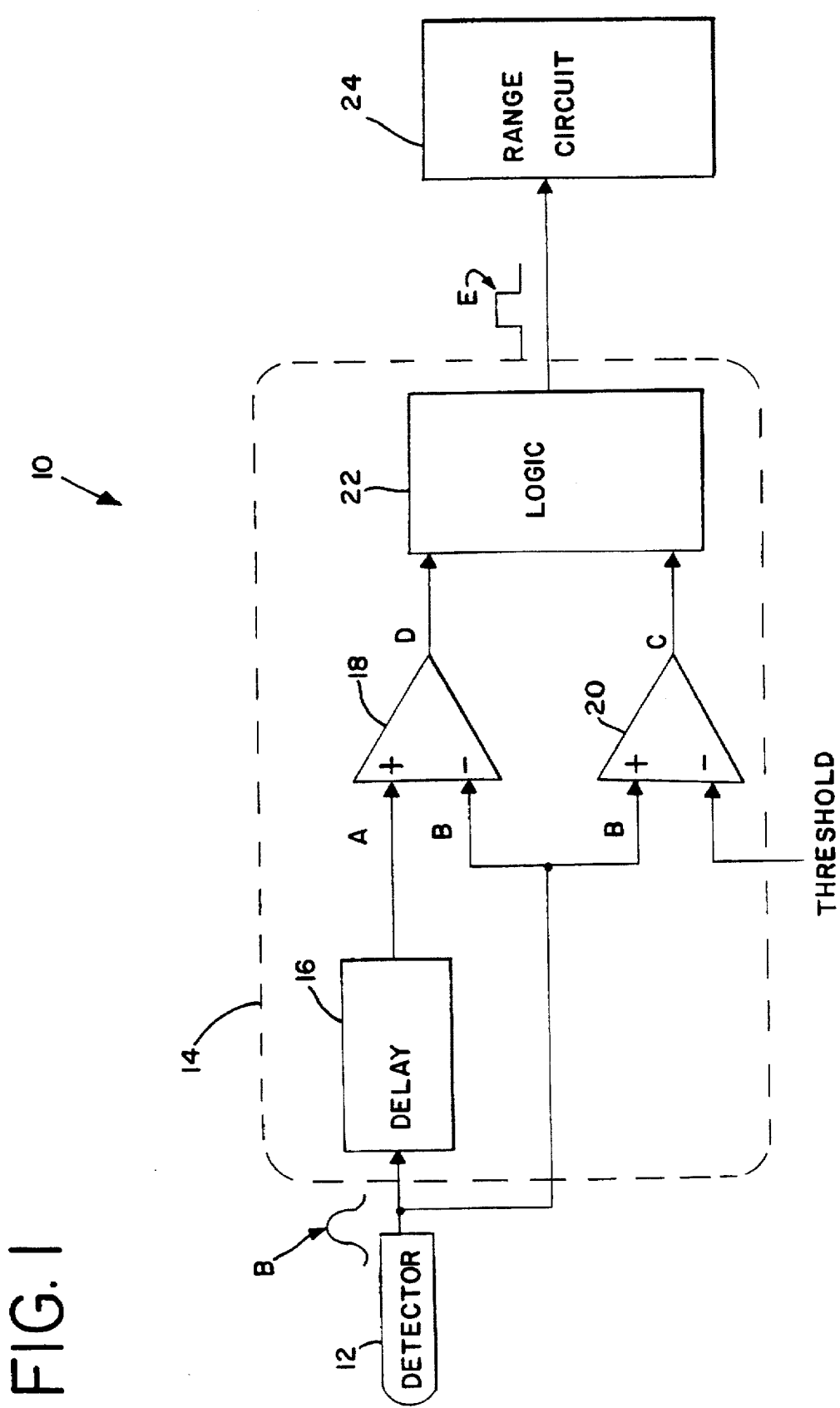
FIG. 1 is a diagram of a range finder system incorporating a delay line circuit and method embodying the present invention. The circuit accepts signal representing optical pulse data, then outputs a digital pulse (E) that is an estimate of optical pulse arrival time.

FIG. 1 illustrates a range finder system 10 incorporating the present invention. The range finder system 10 utilizes the disclosed delay line differentiation circuit 14 to determine "time of flight" and "time of arrival" of reflected laser light. As shown in FIG. 1, the range finder system 10 includes a detector 12 coupled to a delay line circuit 14 coupled to a range finding circuit 24. The delay line circuit 14 includes a delay circuit 16, a first comparator 18, a second comparator 20 and a logic circuit 22. The delay circuit 16 receives the output from the detector 12. The detector 12 output is fed to the first comparator 18 and the second comparator 20. A threshold voltage (representing a threshold noise level) is provided to the second comparator 20. The outputs of the first and second comparators 18, 20 are coupled to a logic circuit 22 that generates a digital pulse (E) representing the time of arrival. This digital pulse is fed to a conventional range finding circuit 24.

Light originated or reflected from the target is detected by the detector 12 in the range finder system 10. The detector 12 generates an analog signal (B) representing the detected laser energy. The analog signal is fed to, inter alia, the delay circuit 16 so that both the analog pulse and a delayed version of the analog pulse are available for analysis. The delay 12 is set such that the analog pulse and the delayed analog pulse cross each other at a predetermined point (shown at 30 in FIG. 2). This cross-over consistently occurs at the same point independent of the size or shape of the analog pulse. Preferably, the cross-over occurs at approximately 70% of the analog pulse amplitude. The cross-over point between the original pulse and the delayed pulse is used to trigger the leading edge of the time of arrival pulse, as described in more detail below.

In general, shape of the analog signal (B) generated by the detector 12 is Gaussian as a function of time. Thus, the analog signal (B) can vary widely, with a very strong optical data input producing a large amount of energy for a long amount of time, and a weak optical data input producing a very small amount of energy for a very short amount of time.

In operation, the first comparator 18 compares the delayed analog signal (A) with the original analog signal (B), while the second comparator 20 compares the original analog signal (B) and a voltage representing a threshold noise level. The second comparator 20 outputs a pulse (C) when the analog signal (B) exceeds the noise threshold. The output of the second comparator 20 is provided to the logic circuit 22 to indicate to the logic circuit 22 that optical pulse data is present on the first comparator 18. The logic circuit 22 is then enabled to receive the output of the first comparator 18 which will provide an indication of the precise time of arrival of the input analog pulse (B).

The first comparator 18 outputs a pulse (D) when the original analog input (B) crosses the delayed analog input (A) at the cross-over point 30. This cross-over consistently occurs at the same relative position on the signal waveform independent of the size or shape of the analog pulse. Preferably, the cross-over 30 occurs at approximately 70% of the analog pulse amplitude. The cross-over point 30 between the original pulse (B) and the delayed pulse (A) triggers the logic circuit 22 to generate the leading edge of the time of arrival pulse (E).

Figure 2:
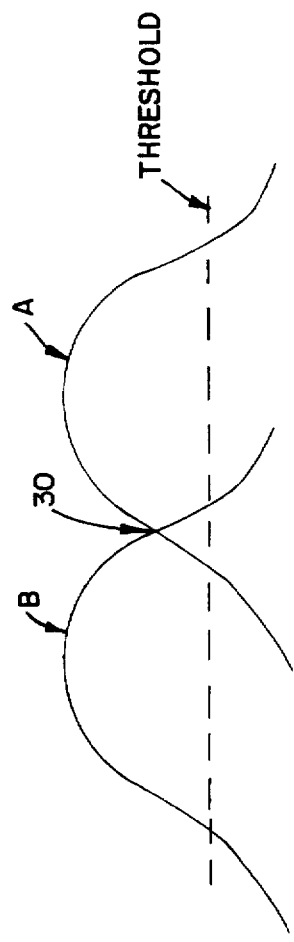
FIGS. 2–5 show four related graphs that illustrate how optical pulse data passes through the circuit of FIG. 1.
Figure 3:
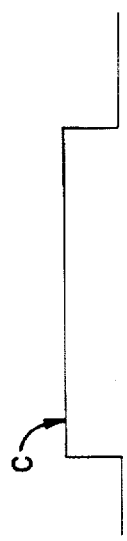
Figure 4:
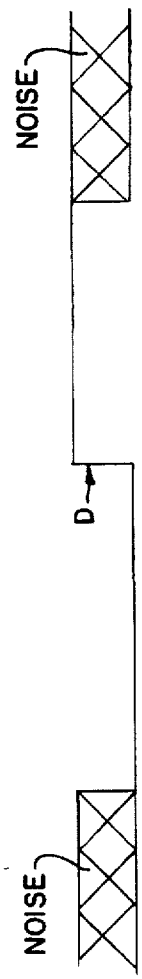
Figure 5:
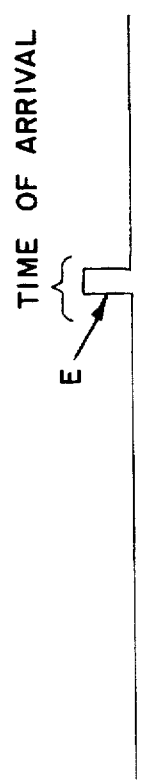

Turning again to the drawings, FIGS. 2–5 are graphs illustrating the various signals (A–E) that move through the range finding system 10, and more particularly, the delay line circuit 14. FIG. 2 illustrates the analog signal (B) output from the detector 12, along with the delayed version (A) of the analog output from the delay circuit 16. FIG. 3 illustrates the signal (C) that is output from the second comparator 20, and FIG. 4 illustrates the signal (D) that is output from the first comparator 18. FIG. 5 illustrates the digital pulse (E) that is output from the logic circuit 22. The digital pulse (E) represents the precise time of arrival of the analog input (B).

As shown in FIGS. 2–5, when the analog pulse (B) exceeds the noise threshold, a positive pulse (C) is generated on the output of the first comparator 18, and a corresponding negative pulse (D) is generated at the output of the second comparator 20. This state continues as the analog signal (B)

decreases and the delayed version (A) of the analog signal increases. At a predetermined point 30, the analog pulses (A, B) cross, and the delayed version (A) of the analog signal is greater than the original analog signal (B). At this cross-over point 30, a positive pulse (D) is generated at the output of the first comparator 18, and a corresponding positive pulse (E) is generated at the output of the logic circuit 22. This state continues until the analog pulse (B) goes below the noise threshold, causing the output of the second comparator 20 to go negative, along with the output of the logic circuit 22.

Figure 6:
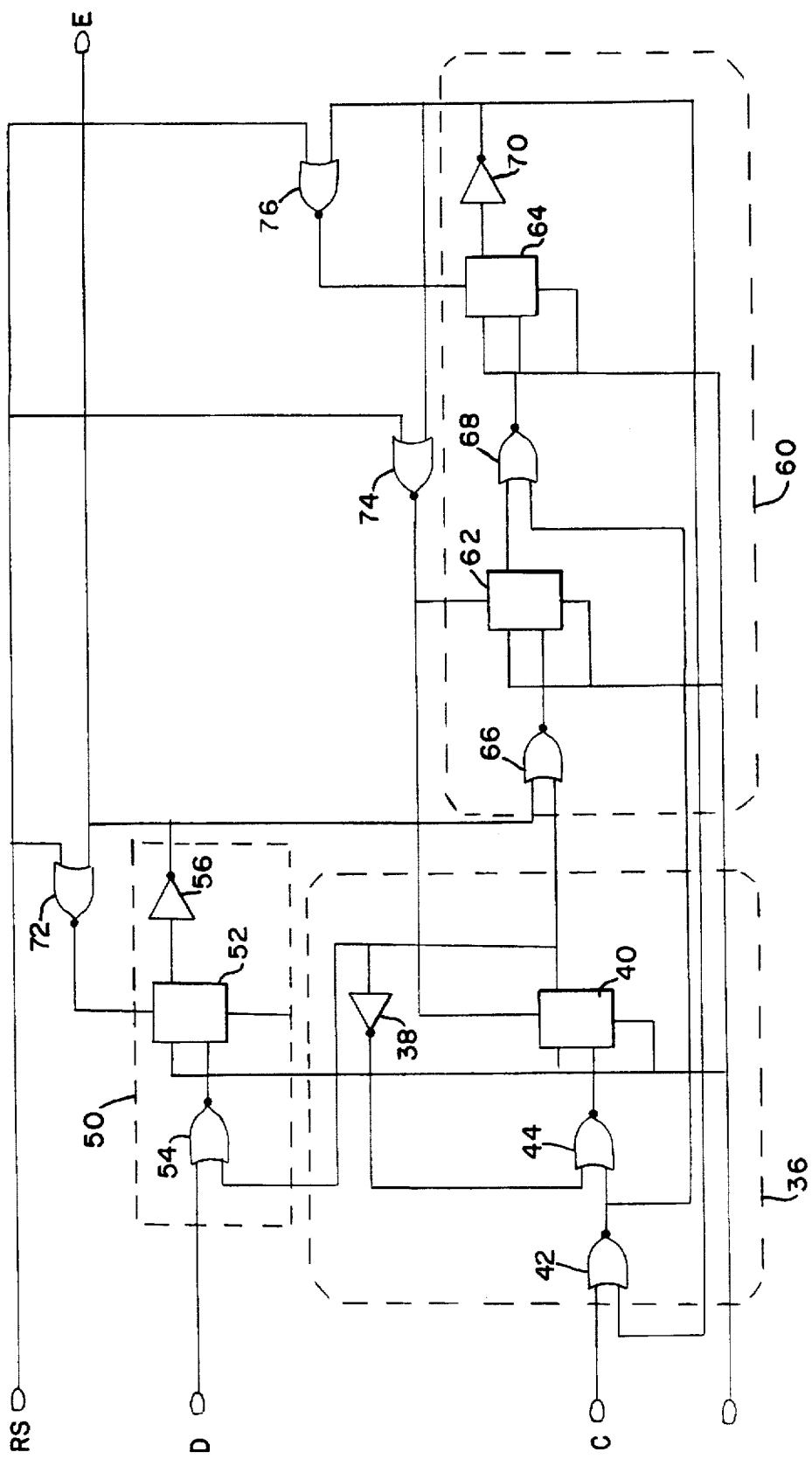
FIG. 6 is more detailed circuit diagram of an exemplary digital circuit for implementing the logic circuit shown in FIG. 1.

FIG. 6 is circuit diagram of a digital circuit 22 for implementing the logic circuit 22 shown in FIG. 1. The circuit 22' is exemplary and not exclusive, and a wide variety of logic circuit designs could be used to implement the logic circuit 22. The disclosed circuit 22' is a configuration of conventional flip flops, exclusive-or gates and invertors, that work in tandem to produce the functions described herein for the logic circuit 22.

In general, the circuit 22' can be divided into three sections. The first section is a detection section 36 that includes an invertor 38 and a flip-flop 40 coupled to two exclusive-or gates 42, 44. The detection section 36 detects when a pulse is present on the output of the second comparator 20, and also enables the measurement section 50.

The second section is a measurement section 50 that includes a flip-flop 52 coupled to an exclusive-or gate 54 and an invertor 56. The measurement section 50 is enabled by the detection section 36. Once enabled, the measurement section 50 generates a time of arrival pulse (E) when the analog signal (B) crosses the delayed version (A) of the analog signal as shown at reference number 30 in FIG. 2.

The third section is a spacing section 60 that includes two flip-flops 62, 64, two exclusive-or gates 66, 68 and an invertor 70. In general, the spacing section 60 ensures that the detection circuit 36 only enables the measurement section 50 on a rising edge of the pulse (C) that is output from the second comparator 20. This ensures that the analysis of one optical pulse is completed before beginning the analysis of the next optical pulse, thus allowing the system 10 to respond to closely spaced targets.

The logic circuit 22' is initialized when the reset (RS) input is at a logic "high," thus setting all of the flip-flops 40, 52, 62, 64 to a logic "high" (via exclusive-or gates 72, 74, 76) and setting the time of arrival output (E) to a logic "low." A rising edge on the output of the second comparator 20 clocks the flip-flop 40 of the detection circuit 36. The output of the flip-flop 40 enables the output of the first comparator 18 to propagate through an exclusive-or gate 54 which clocks the flip-flop 52 of the measurement section 50. Each successive time of arrival output (E) will only occur while the output of the second comparator 20 is high. The first pulse on the output of the first comparator 18 following a pulse on the output of the second comparator 20 always generates an output pulse regardless of the state of (C) when the signal (D) occurs. Once (C) goes low, another low to high transition is required before another time of arrival pulse (E) can be generated. The two flip-flops 62, 64 in the spacing section 60 ensures that this occurs correctly. When the output time of arrival pulse (E) is generated, it clocks one of the flip-flops 64, 66 in the spacing section 60. The output of the first flip-flop 64 in the spacing section 60 then clocks another flip-flop 66 in the spacing section 60 only if the output signal (E) is low. If the output signal (E) is low, the flip-flop 64 is clocked and its output inhibits the generation of anymore time of arrival output pulses (E) until a new rising edge (C) is detected by the flip-flop Accordingly, the present invention provides several advantages. The delay 16 is set such that the analog pulse (B) and the delayed analog pulse (B) cross each other at a predetermined point 30. The cross-over consistently occurs in the same relative position 30 on the analog pulse independent of the size or shape of the analog pulse. Preferably, the cross-over occurs at approximately 70% of the analog pulse amplitude. The cross-over point between the analog pulse and the delayed analog pulse triggers the leading edge of the time of arrival pulse. Further, for distance accuracy requirements of +/−1 meter, and for low-cost smaller laser light sources having relatively wider pulses (about 15 to 25 nsec), the disclosed delay line circuit 14 provides a sufficiently precise and consistent time of arrival estimate. Accordingly, the circuit and method of present invention makes precise and consistent time of arrival measurements on received optical pulse data of widely varying widths, thereby allowing the consistent and accurate calculation of distance estimates in range finders, target designators, and other similar systems.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A circuit for determining the time of arrival of a signal, the circuit comprising:
   a delay circuit receiving the signal from a signal detector and generating a delayed signal; and
   a comparison circuit receiving the signal directly from said signal detector without said signal having passed through attenuation circuitry, said comparison circuit also receiving said delayed signal and generating an output pulse when said delayed signal exceeds said signal, said comparison circuit output pulse representing the time of arrival of said signal.

2. The circuit of claim 1 wherein:
   said signal comprises an amplitude; and
   said delayed signal exceeds said signal a predetermined percentage of said amplitude.

3. The circuit of claim 2 wherein said predetermined percentage comprises approximately 70.

4. The circuit of claim 1 further comprising a second comparator receiving the signal and a threshold and generating an output pulse when said signal exceeds said threshold.

5. The circuit of claim 4 further comprising:
   a logic circuit receiving said comparison circuit output pulse and said second comparison circuit output pulse;
   said logic circuit interpreting said second comparison circuit output pulse as representing that said signal has exceeded said threshold;
   said logic circuit interpreting said comparison circuit output pulse as representing the time of arrival of said signal.

6. The circuit of claim 5 wherein:
   said signal comprises an amplitude; and
   said delayed signal exceeds said signal a predetermined percentage of said amplitude.

7. The circuit of claim 6 wherein said predetermined percentage comprises approximately 70.

8. The circuit of claim 5 wherein said logic circuit generates a logic circuit output pulse whose leading edge represents the time of arrival of said signal.

9. The circuit of claim 8 wherein a trailing edge of said logic circuit output pulse represents that said threshold has exceeded said signal.

10. The circuit of claim 1 further comprising a detector detecting electromagnetic energy and generating said signal, whereby said signal represents said electromagnetic energy.

11. The circuit of claim 10 wherein said electromagnetic energy comprises optical energy.

12. The circuit of claim 11 wherein said optical energy comprises laser energy.

13. The circuit of claim 1 further comprising a range finding circuit coupled to said comparison circuit and determining a range based on said comparison circuit output pulse.

14. A system for determining a range from a predetermined location to a target, said system comprising:

a detector detecting electromagnetic energy reflected from the target, said detector generating a signal representing said electromagnetic energy;

a delay circuit receiving the signal and generating a delayed signal;

a comparison circuit receiving the signal directly from said detector without said signal having passed through attenuation circuitry, said comparison circuit also receiving said delayed signal and generating an output pulse when said delayed signal exceeds said signal, said comparison circuit output pulse representing the time of arrival of said signal; and a range finding circuit coupled to said comparison circuit and determining a range based on said comparison circuit output pulse.

15. The circuit of claim 14 wherein:

said signal comprises an amplitude; and said delayed signal exceeds said signal a predetermined percentage of said amplitude.

16. The circuit of claim 15 wherein said predetermined percentage comprises approximately 70.

17. The circuit of claim 14 further comprising a second comparator receiving the signal and a threshold and generating an output pulse when said signal exceeds said threshold.

18. The circuit of claim 17 further comprising:

a logic circuit receiving said comparison circuit output pulse and said second comparison circuit output pulse;

said logic circuit interpreting said second comparison circuit output pulse as representing that said signal has exceeded said threshold;

said logic circuit interpreting said comparison circuit output pulse as representing the time of arrival of said signal.

19. The circuit of claim 18 wherein:

said signal comprises an amplitude; and said delayed signal exceeds said signal a predetermined percentage of said amplitude.

20. The circuit of claim 19 wherein said predetermined percentage comprises approximately 70.

21. A method of determining the time of arrival of a signal, the steps comprising:

generating a delayed version of said signal;

comparing the signal and said delayed signal, wherein the signal that is compared with said delayed signal has not passed through attenuation circuitry;

generating an output pulse when said delayed signal exceeds said signal, said output pulse representing the time of arrival of said signal.

22. The method of claim 21 wherein:

said signal comprises an amplitude; and said delayed signal exceeds said signal a predetermined percentage of said amplitude.

23. The method of claim 22 wherein said predetermined percentage comprises approximately 70.

24. The method of claim 21 further comprising the steps of:

comparing the signal and a threshold and generating a second output pulse when said signal exceeds said threshold.

25. The method of claim 24 further comprising the steps of:

interpreting said second output pulse as representing that said signal has exceeded said threshold; and interpreting said output pulse as representing the time of arrival of said signal.

26. The method of claim 25 wherein:

said signal comprises an amplitude; and said delayed signal exceeds said signal at a predetermined percentage of said amplitude.

27. The method of claim 26 wherein said predetermined percentage comprises approximately 70.

28. The method of claim 21 further comprising the step of determining a range based on said comparison circuit output pulse.

29. A method of determining a range from a predetermined location to a target, the steps comprising:

detecting electromagnetic energy reflected from the target;

generating a signal representing said electromagnetic energy;

generating a delayed signal;

comparing the signal and said delayed signal, wherein the signal that is compared with said delayed signal has not passed through attenuation circuitry;

generating an output pulse when said delayed signal exceeds said signal, said output pulse representing the time of arrival of said signal; and determining a range based on said comparison circuit output pulse.

30. The method of claim 29 wherein:

said signal comprises an amplitude; and said delayed signal exceeds said signal a predetermined percentage of said amplitude.

31. The method of claim 30 wherein said predetermined percentage comprises approximately 70.

* * * * *